United States Patent Office 3,147,281
Patented Sept. 1, 1964

3,147,281
LACTONE SYNTHESIS
Clyde Lee Aldridge, Baton Rouge, and Neville Leverne Cull, Baker, La., assignors to Esso Research and Engineering Company, a corporation of Delaware
No Drawing. Filed July 10, 1962, Ser. No. 208,913
2 Claims. (Cl. 260—343.6)

This invention relates to the synthesis of organic oxygen containing compounds and more particularly to the preparation of lactones by the interaction of cyclic monoethers with carbon monoxide and a catalyst in a process as hereinafter set forth.

GENERAL

The reaction of dialkylethers with carbon monoxide to form carboxylic esters or acids has been known for a number of years. U.S. Patent No. 2,364,438, which issued on December 5, 1944, to Gresham, disclosed the reaction between cyclic diethers, especially cyclic formals, and carbon monoxide in the presence of acidic catalysts such as boron fluoride. The Gresham patent taught that the reaction should be carried out at preferred temperatures of from 10° to 200° C. and pressures between 30 and 700 atmospheres. The catalyst concentration, as disclosed by Gresham, was in the range of from less than 0.01 mole up to 1 mole of catalyst per mole of compound reacted with the carbon monoxide. The Gresham patent, which is incorporated herein by reference, discloses catalysts such as hydrochloric, sulfuric and phosphoric acids as well as potassium acid sulfate, acetic acid and paratoluenesulfonic acid. A later patent U.S. Patent No. 2,432,474, granted to Gresham on December 9, 1947, indicated that when cyclic ethers, other than formals, were reacted under the conditions required by U.S. Patent No. 2,364,438 for the introduction of carbon monoxide, tarry products resulted. U.S. Patent No. 2,432,474 disclosed the reaction of cyclic monoethers with water and carbon monoxide in the presence of nickel carbonyl. The product obtained was a monocarboxylic or dicarboxylic acid.

DISCOVERY

It has now been surprisingly discovered that, by using acid catalyst to cyclic monoether molar ratios in excess of 1 to 1, rather than ratios of 0.01 to 1.0 as previously taught, a very selective lactone synthesis is obtained.

The utility of lactones, in general, is well known in the art. They are good solvents. They may be converted to hydroxy acids, chloro acids, or cyano acids. Alternatively, they may be converted to lactams which are capable of giving linear polymers, e.g., pyrollidone can be made from α-butyrolactone and ammonia and subsequently converted to a linear polymer (nylon 4) in the presence of an alkaline catalyst. The lactams may also be condensed with acetylene to give N-vinyl substituted pyrollidones which may then be polymerized to form polyvinyl substituted pyrollidones. They are useful as blood plasma substitutes and as an ingredient in hair sprays.

DISCUSSION

The cyclic monoethers which may be employed are those having 5 and 6 membered rings (i.e., the furans and pyrans) which may be substituted or unsubstituted. The furans, especially tetrahydrofuran and its derivatives, e.g., 2,5-dimethyltetrahydrofuran, are particularly suited to this reaction. A possible source of $C_5$ expoides for use according to the present invention is the non-catalytic oxidation of paraffins in the vapor phase. In the most preferred embodiment of the present invention, all of the members of the ring in the cyclic monoether, except for the one oxygen atom, are carbon atoms. Acid catalysts which may be employed include phosphoric acid, hydrochloric acid, sulfuric acid, boron trifluoride and phosphoric acid complex. Of these, sulfuric acid is particularly suited for use according to the present invention. The acid employed should be a normally liquid acid and be concentrated, e.g., 90 wt. percent.

The carbon monoxide may be obtained via any one of a number of known techniques and will generally be used in amounts in excess of the stoichiometric requirements. The mole ratio of acid catalyst to cyclic monoether should be greater than 1 to 1, preferably from 3–10 to 1, and more preferably from 5–10 to 1. Reaction pressures will generally be from 20 to 2,000 p.s.i.g. and preferably from 400 to 900 p.s.i.g. The temperatures employed may range from 10° to about 200° C. but will preferably be from 30° to 100° C. The reaction time will generally be from ½ to 10 hours, but preferably will not exceed 5 hours.

EXAMPLES

The present invention will be more clearly understood by reference to the following examples.

Example 1

Three hundred thirty-six ml. (590 grams or ca. 6.0 moles) of 96% $H_2SO_4$ was charged to a 1 liter stirred autoclave. Eighty-nine ml. (74 grams or ca. 0.86 mole) of 2-methyltetrahydrofuran (Eastman White Label) was added incrementally (ca. 5 ml. increments) after the autoclave had been pressured to approximately 450 p.s.i.g. with carbon monoxide. Approximately 45 minutes was required to add all of the 2-methyltetrahydrofuran. During the addition, the temperature rose from 27° C. to approximately 35° C. When the addition had been completed, the CO pressure was raised to 840 p.s.i.g. and the temperature increased to 50° C. The temperature of 50° C. was maintained for about 4 hours. When the reaction was complete (as evidenced by no additional pressure drop) the autoclave was cooled to about 21° C. and the CO vented slowly. The liquid reaction mixture was poured from the autoclave into a beaker and added slowly, with stirring, to 300 ml. of ice water. After stirring for 30 minutes, the contents of the beaker were allowed to stand overnight in a stoppered container. The reaction mixture was then placed in a 3 liter round bottom flask, surrounded by ice water, and equipped with a condenser, dropping funnel and stirrer. Two hundred forty grams (6 moles) of NaOH in 300 grams of water was added to the reaction mixture over a period of 1 hour. A phase separation was noted at this point. Additional NaOH (240 grams in 300 grams of water) was added to a pH of 5 while maintaining the temperature below 76° C., whereupon a copious white precipitate of $Na_2SO_4$ formed and a good separation was noted between the aqueous and organic layers.

The mixture was cooled to 25° C. and transferred to a 2 liter separatory funnel with the aid of 300 ml. of water and diethyl ether. The organic material was extracted with a total of 450 ml. of diethyl ether (used in three portions). Seven grams of a thick black material (insoluble in ether or saturated aqueous solution) was separated from the mixture. The combined ether extract was allowed to stand overnight with five grams of activated charcoal (Darco). It was then filtered, washed twice with 10 ml. increments of water, and dried over 50 grams of anhydrous calcium sulfate (white Drierite). The ether was distilled at atmospheric pressure using a 2/1 reflux ratio. After approximately 90% of the ether had been removed, the mixture was transferred to a 250 ml. flask and the remainder of the ether was removed. The remaining material was then distilled under reduced pressure and a lactone fraction boiling at 73°–74° C. at 6 mm. Hg was obtained. This fraction was identified as α-methyl γ-valerolactone by its infra-red spectrum and refractive index. The yield of lactone based on the original charge of 2 methyl tetrahydrofuran was 54% by weight or about 40% of the theoretical yield.

*Example 2*

Three hundred thirty-six ml. of concentrated sulfuric acid (96 wt. percent) was added to a 1 liter autoclave in a process substantially as described in Example 1. Tetrahydrofuran (72.1 grams) was added incrementally over a period of about 40 minutes. The CO pressure was initially 450 p.s.i.g. When all of the tetrahydrofuran had been added, the CO pressure was raised to 850 p.s.i.g. and the temperature raised to 80° C. The temperature was maintained at about 80° C. for 3½ hours. The product was recovered by the technique previously described with reference to Example 1 and was identified as γ-valerolactone by its boiling point, refractive index and infra-red spectrum. The yield of product (γ valerolactone) was 26 wt. percent based on the weight of the original feed (tetrahydrofuran).

*Example 3*

Five hundred ninety grams of 96 wt. percent sulfuric acid was added to a 1 liter stirred autoclave in a process substantially as described in Example 1. The CO pressure was initially 450 p.s.i.g. Eighty-six grams of 2,5-dimethyltetrahydrofuran was added incrementally over a 50 minute period while raising the CO pressure to 770 p.s.i.g. The temperature was raised to 50° C. The temperature was maintained at 50° C. for approximately 2½ hours. The product was isolated as previously described with reference to Example 1 and was identified as α-methyl γ-caprolactone by its infra-red spectrum and the melting point of its hydrazide. The product yield was 77 wt. percent of α-methyl γ-caprolactone based on the weight of the original feed (2,5-dimethyltetrahydrofuran).

The effect of the mole ratio of sulfuric acid to cyclic monoether in the lactone synthesis can be seen in Table I. The conversion of the cyclic ether to the lactone is indicated by the change in pressure of CO which is a measure of CO consumption. It will be noted that essentially no reaction (as indicated by the change in pressure of CO) takes place at a 1 to 1 mole ratio, a slight reaction at 3 to 1 mole ratio and a good reaction at a 6 to 1 mole ratio.

*Table I*

EFFECT OF THE MOLE RATIO OF ACID/CYCLIC MONOETHER ON THE CARBONYLATION OF 2,5-DIMETHYL-TETRAHYDROFURAN (2,5-DMTHF)

| Mole Ratio of $H_2SO_4$/2,5-DMTHF | 1/1 | 3/1 | 6/1 |
|---|---|---|---|
| Temp. Range (°C.) | 28–60 | 23–68 | 29–50 |
| Time (Hours) | 4.5 | 6.5 | 3.5 |
| ΔP of CO (p.s.i.) | 0 | 50 | 405 |

Table II compares the treatment of 2,5-dimethyltetrahydrofuran and gamma valerolactone under carbonylation conditions. The 2,5-dimethyltetrahydrofuran reacts under these conditions to form a lactone (α-methyl γ-caprolactone) while the gamma valerolactone does not react and thus demonstrates its stability under these carbonylation conditions.

*Table II*

ATTEMPTED CARBONYLATION OF 2,5-DIMETHYL-TETRAHYDROFURAN AND α-VALEROLACTONE

| | 2,5-DMTHF | γ-Valerolactone |
|---|---|---|
| Mole Ratio $H_2SO_4$/Feed | 6/1 | 6/1 |
| ΔP of CO (p.s.i.) | 405 | 0 |
| Temperature Range (°C.) | 29–50 | 29–72 |
| Time (Hours) | 3.5 | 2.5 |

While the invention has been described with particular reference to certain examples, it is to be understood that other embodiments within the spirit and scope of the present invention as hereinafter claimed will be obvious to those skilled in the art.

What is claimed is:

1. A process for the preparation of a lactone which comprises reacting tetrahydrofuran with carbon monoxide in the presence of a concentrated liquid acid catalyst selected from the group consisting of phosphoric acid, hydrochloric acid, sulfuric acid and boron trifluoride and phosphoric acid complex, said acid catalyst being present in a mole ratio of acid to cyclic monoether of at least 3 to 1, at a temperature of from 10° to 200° C. and a pressure of from 20 to 2,000 p.s.i.g. for a period of from ½ to 10 hours, and thereafter recovering a lactone from said reaction.

2. A process for the preparation of a lactone which comprises reacting tetrahydrofuran with carbon monoxide in the presence of concentrated sulfuric acid catalyst, said catalyst being present in a mole ratio of catalyst to tetrahydrofuran of about 6 to 1, at a temperature of about 80° C. and a pressure of from 450 to 850 p.s.i.g., for a period of about 3½ hours, and recovering a lactone from said reaction.

References Cited in the file of this patent

UNITED STATES PATENTS

| | | |
|---|---|---|
| 2,453,890 | Bremner et al. | Nov. 16, 1948 |
| 2,913,489 | Benedictis et al. | Nov. 17, 1959 |
| 3,060,197 | Anderson et al. | Oct. 23, 1962 |